(12) United States Patent
McKitty (10) Patent No.: US 12,225,883 B1
(45) Date of Patent: Feb. 18, 2025

(54) ANIMAL WASTE COLLECTION DEVICE

(71) Applicant: Vincent McKitty, Bronx, NY (US)

(72) Inventor: Vincent McKitty, Bronx, NY (US)

( * ) Notice: Subject to any disclaimer, the term of this patent is extended or adjusted under 35 U.S.C. 154(b) by 0 days.

(21) Appl. No.: 18/368,330

(22) Filed: Sep. 14, 2023

(51) Int. Cl.
*A01K 23/00* (2006.01)

(52) U.S. Cl.
CPC .................................. *A01K 23/00* (2013.01)

(58) Field of Classification Search
CPC ....................................................... A01K 23/00
See application file for complete search history.

(56) References Cited

U.S. PATENT DOCUMENTS

| | | | | |
|---|---|---|---|---|
| 2,173,356 A | * | 9/1939 | Cross | ...................... A01K 23/00 119/869 |
| 3,090,356 A | * | 5/1963 | Andrisani | ............... A01K 23/00 119/869 |
| 4,502,417 A | * | 3/1985 | Jenkins | ................... A01K 23/00 119/868 |
| 4,537,153 A | | 8/1985 | Vidal | |
| 4,813,949 A | * | 3/1989 | O'Rourke | ................ A61F 13/49 604/394 |
| 5,386,802 A | | 2/1995 | Hang-Fu | |
| 5,427,059 A | * | 6/1995 | Logan | ...................... A01K 23/00 119/792 |
| 5,819,691 A | | 10/1998 | Lavi | |
| 6,394,041 B1 | * | 5/2002 | Katz | ....................... A01K 23/00 119/868 |
| 8,757,101 B1 | * | 6/2014 | Phipps | .................... A01K 23/00 119/868 |
| 9,113,613 B2 | | 8/2015 | Dixon | |
| D968,719 S | | 11/2022 | Xu | |
| 2011/0126779 A1 | | 6/2011 | Walls | |
| 2015/0189859 A1 | * | 7/2015 | John | ....................... A01K 23/00 119/868 |
| 2022/0400654 A1 | | 12/2022 | Kosanke | |

FOREIGN PATENT DOCUMENTS

WO      WO2021203547      10/2021

* cited by examiner

*Primary Examiner* — Kristen C Hayes (57) ABSTRACT

An animal waste collection device for collecting animal waste includes a harness that is removably positionable on a canine adjacent to a hindquarter of the canine. A container is attachable to the harness and configured to receive animal waste from the canine. The container has a top side that is open. The container has a front wall and a rear wall that are attached together along corresponding bottom and lateral edges thereof. The front wall is planar, and the rear wall has a convexly arcuate outer surface. An attachment secures the container to the harness such that the container is positioned rearward of the canine. A waste bag is removably inserted into and covers an interior surface of the container.

13 Claims, 10 Drawing Sheets

ANIMAL WASTE COLLECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet waste management and more particularly pertains to a new pet waste management device for collecting animal waste before the animal waste contacts the ground surface.

(2) Description of Related Art Including Information Disclosed Under 37 CFR 1.97 and 1.98

The prior art relates to pet waste management. Many people prefer to take their pets on walks so that the pets can use the bathroom. In such situations, the person will need a means of collecting the pet's waste for disposal. Prior art devices include disposable bags with which a user can collect animal waste for disposal. Particularly when the person is taking the pet on a long walk, or bringing the pet along for other activities, it can be very inconvenient to carry these waste bags. Other devices include pet diapers or other wearables that can collect animal waste. However, the diaper needs to be changed and thrown away relatively quickly after the animal uses the bathroom to control the odor from the waste and to keep the pet clean and comfortable. The prior art also discloses various shovels, rakes, and scoops with which a person can collect animal waste from their own yard. However, these devices are also inconvenient to carry along on an outing with the pet. Thus, there is a need in the art for a sanitary and convenient device for collecting animal waste. There is also a need in the art for a device that can store the animal waste for some time until the person and their pet are in a location where the waste can be thrown away. Finally, there is a need in the art for a device that can contain the odor of the waste before it is thrown away.

BRIEF SUMMARY OF THE INVENTION

An embodiment of the disclosure meets the needs presented above by generally comprising a harness that is removably positionable on a canine adjacent to a hindquarter of the canine. A container is attachable to the harness and configured to receive animal waste from the canine. The container has a top side that is open. The container has a front wall and a rear wall that are attached together along corresponding bottom and lateral edges thereof. The front wall is planar, and the rear wall has a convexly arcuate outer surface. An attachment secures the container to the harness such that the container is positioned rearward of the canine. A waste bag is removably inserted into and covers an interior surface of the container.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
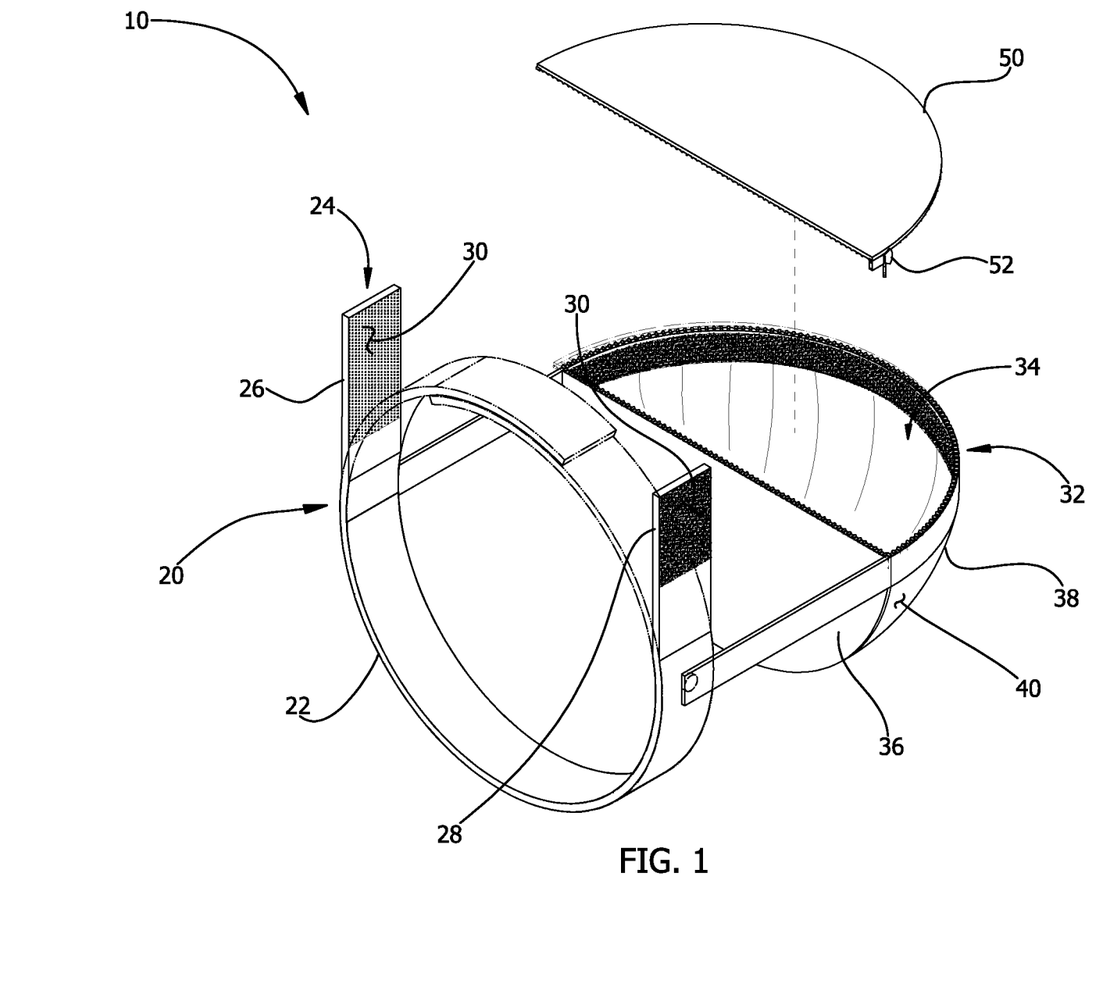
FIG. 1 is a top front isometric view of an animal waste collection device according to an embodiment of the disclosure.
Figure 2:
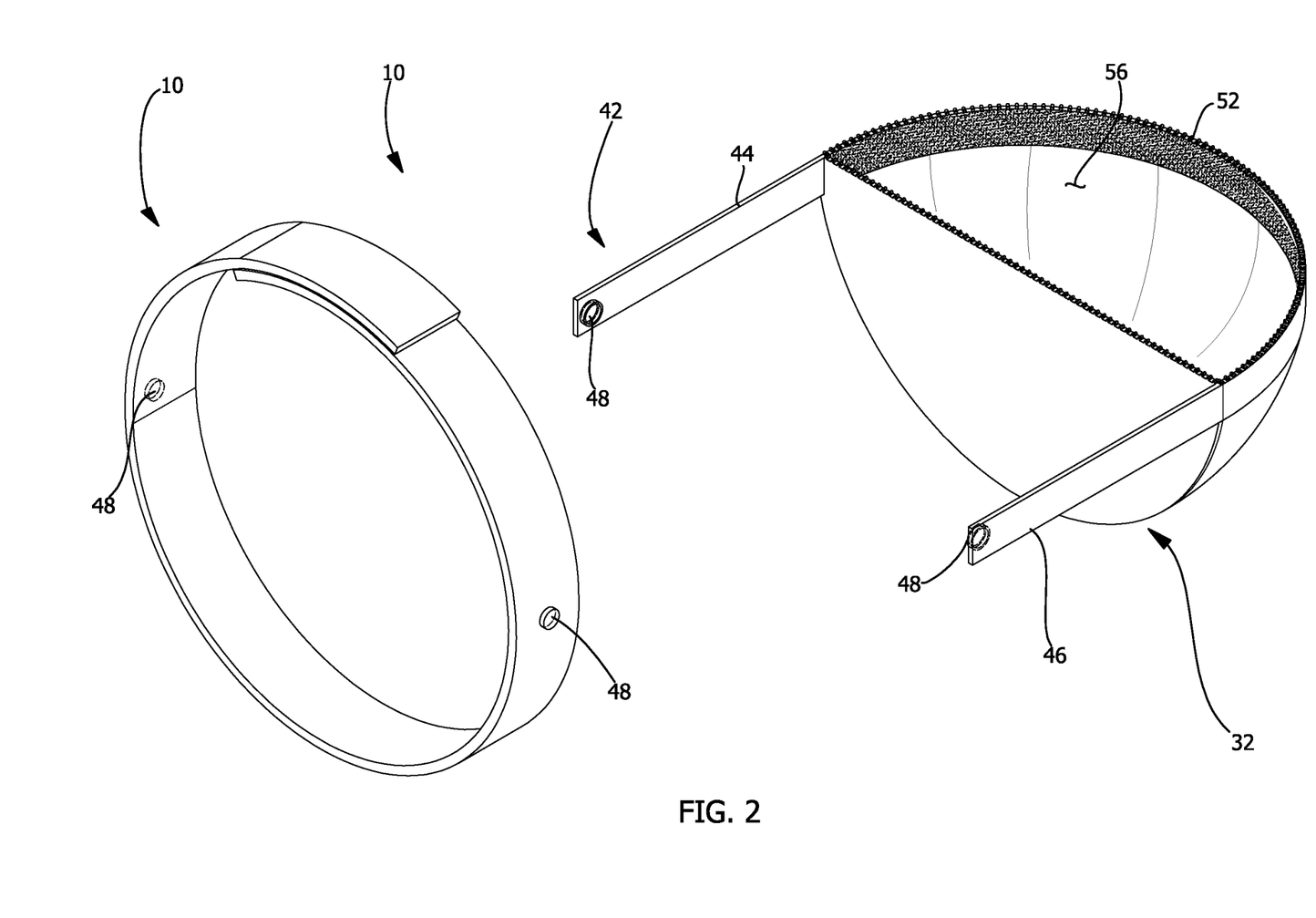
FIG. 2 is a top front isometric view of an embodiment of the disclosure.
Figure 3:
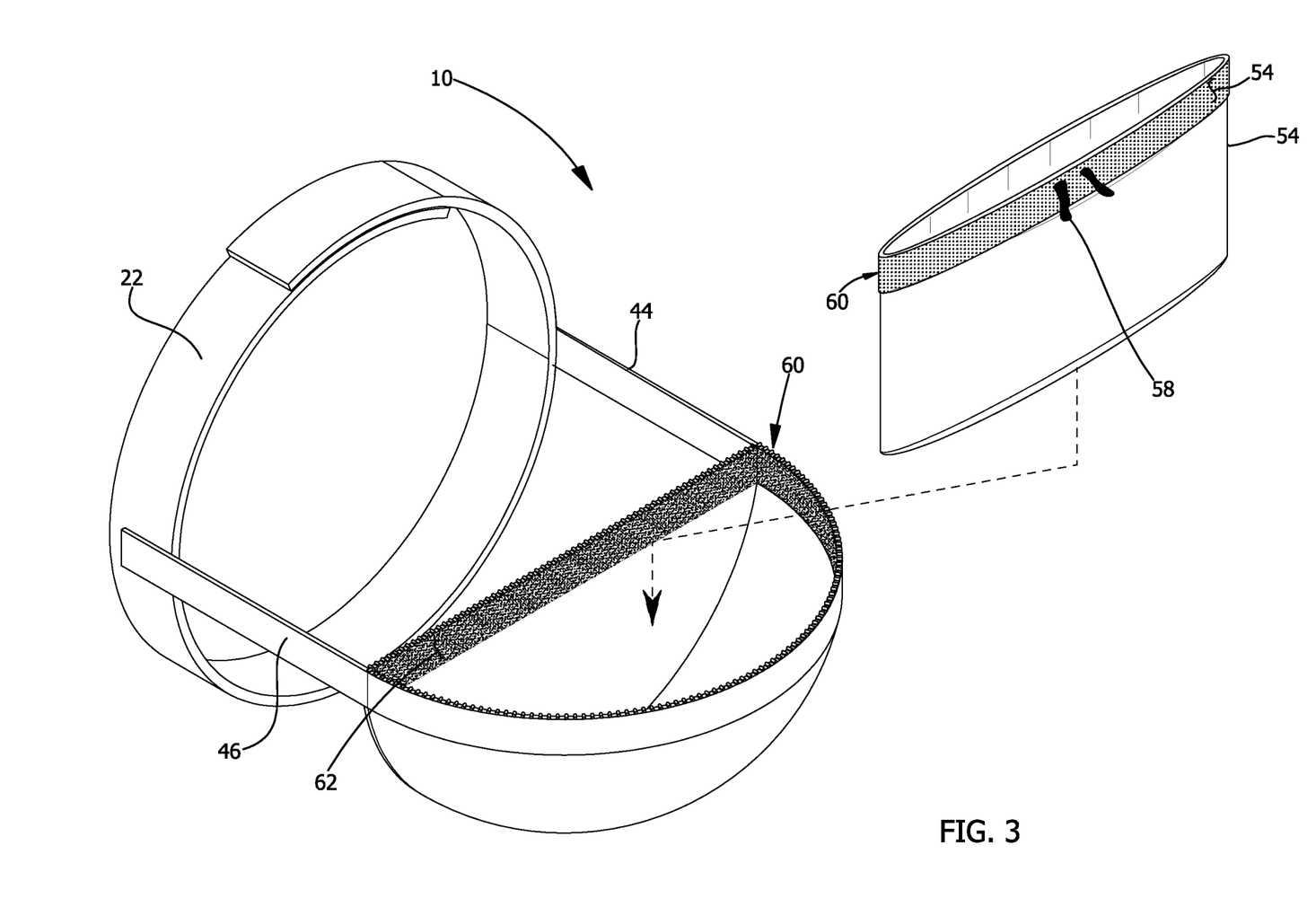
FIG. 3 is a top rear isometric view of an embodiment of the disclosure.
Figure 4:
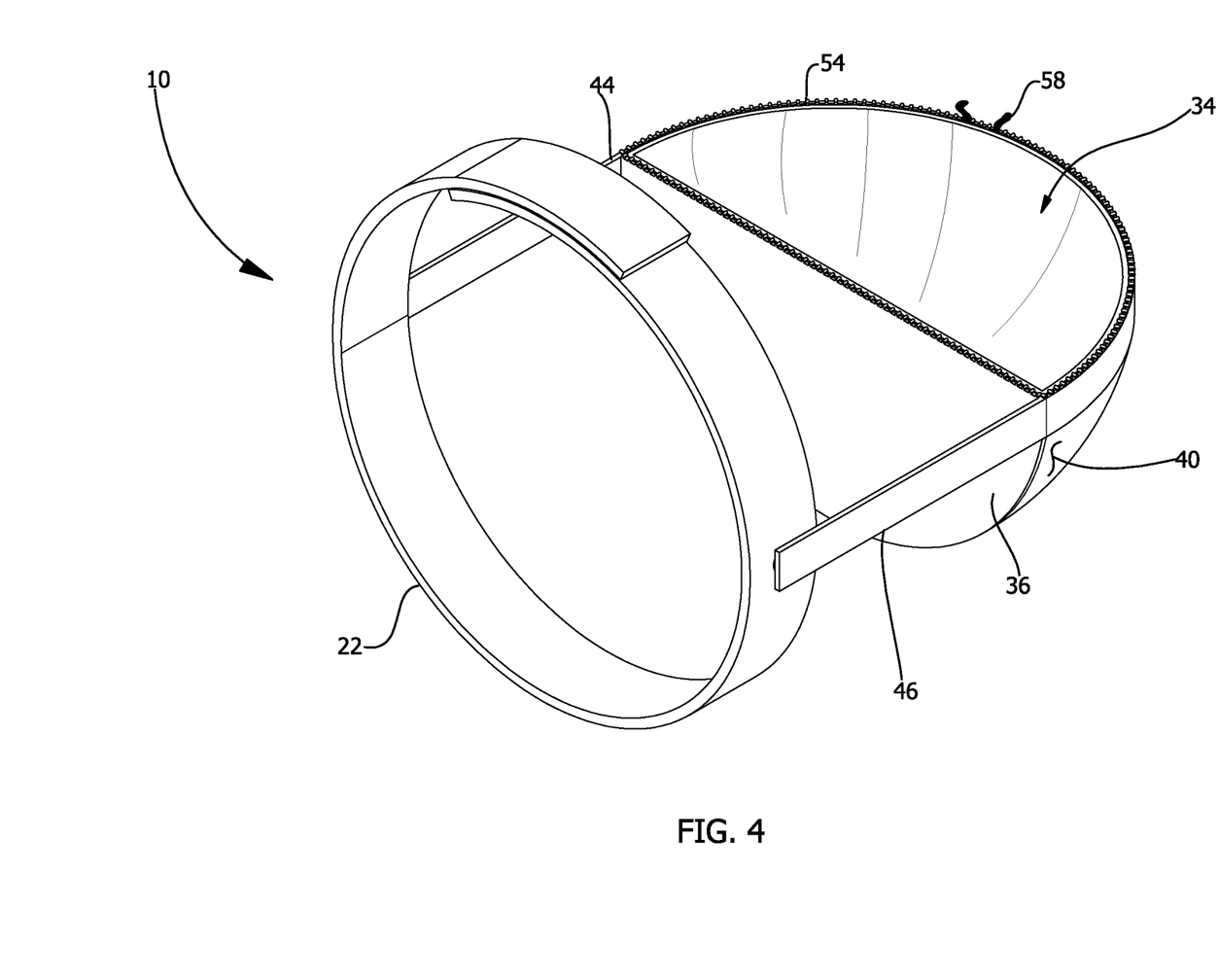
FIG. 4 is a top front isometric view of an embodiment of the disclosure.
Figure 5:
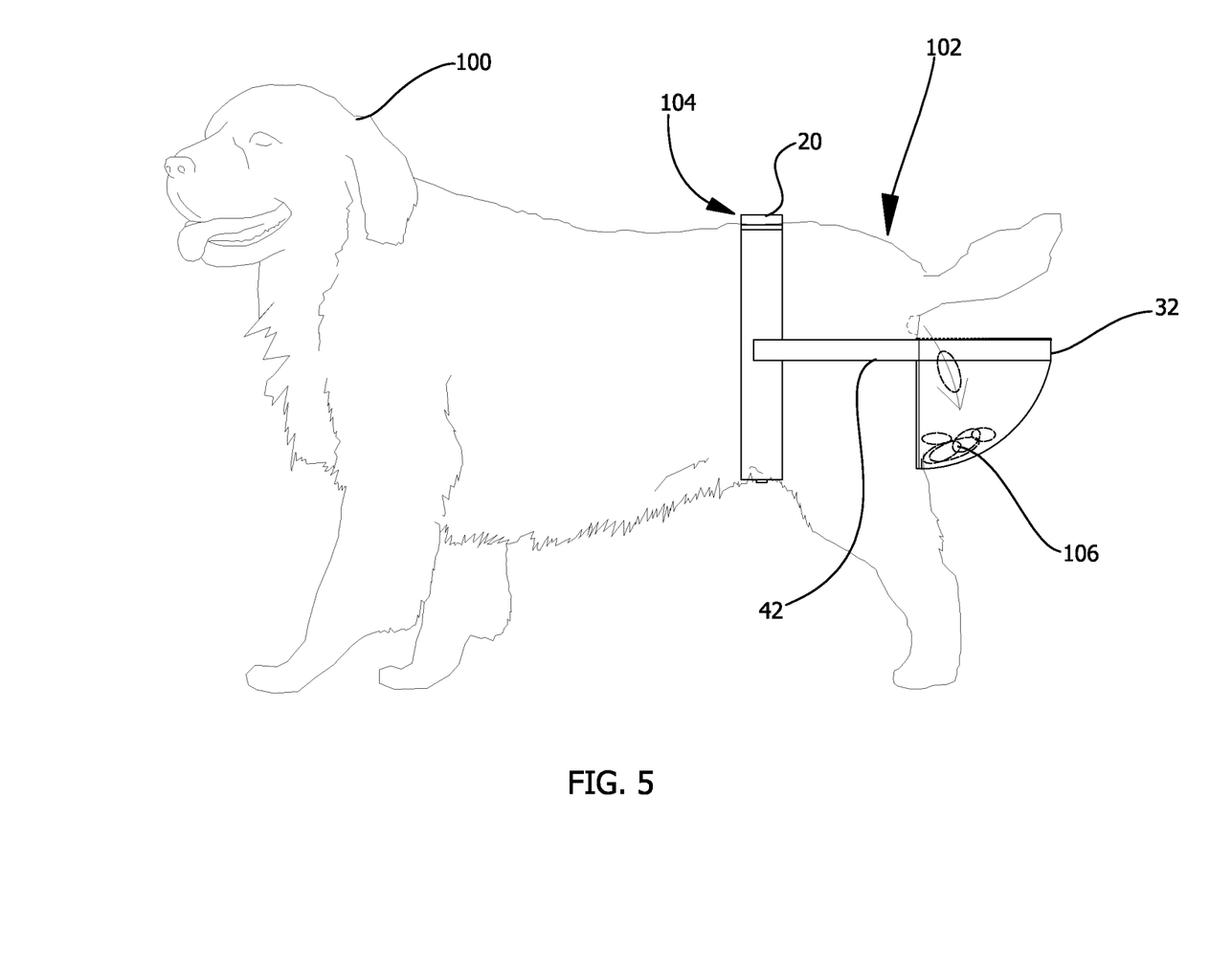
FIG. 5 is a side in-use view of an embodiment of the disclosure.
Figure 6:
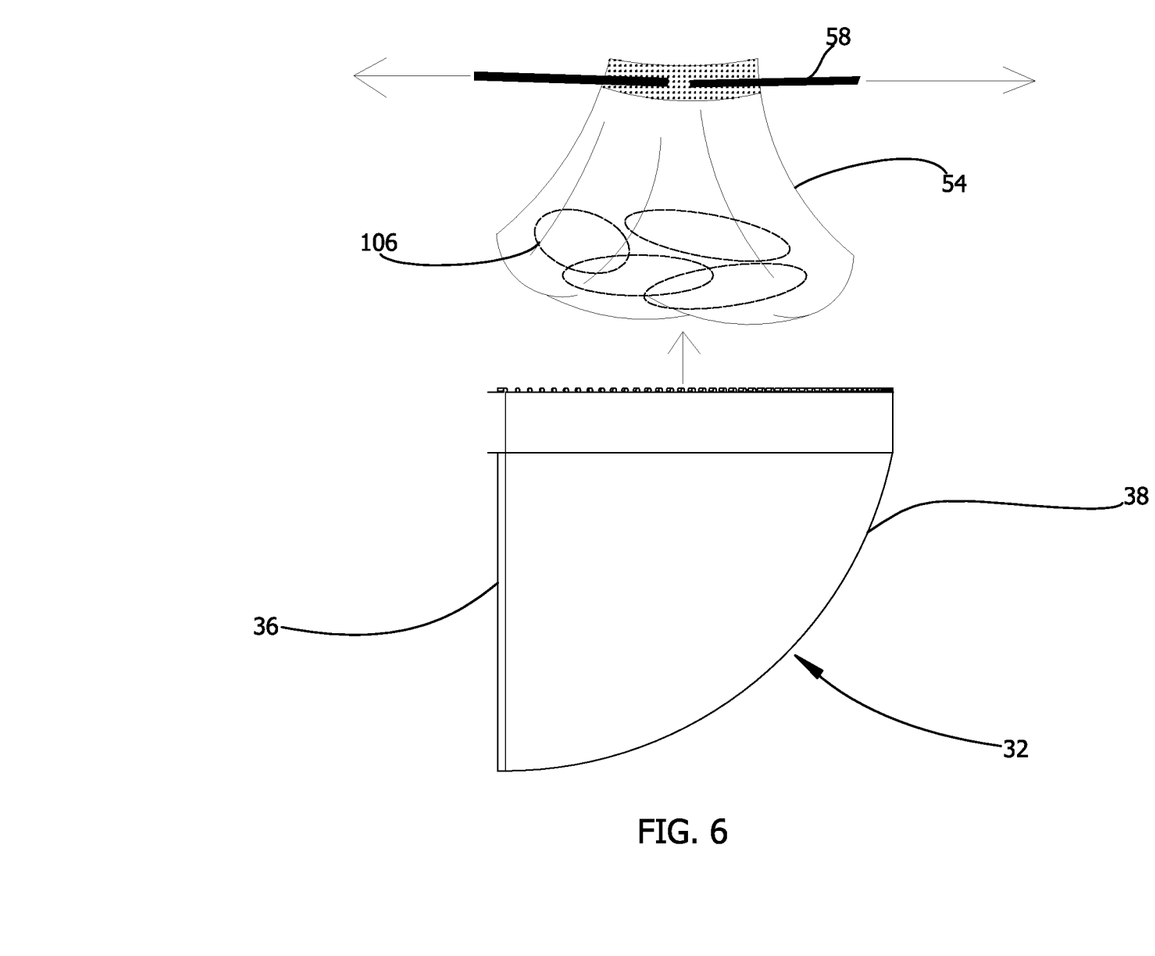
FIG. 6 is an in-use view of an embodiment of the disclosure.
Figure 7:
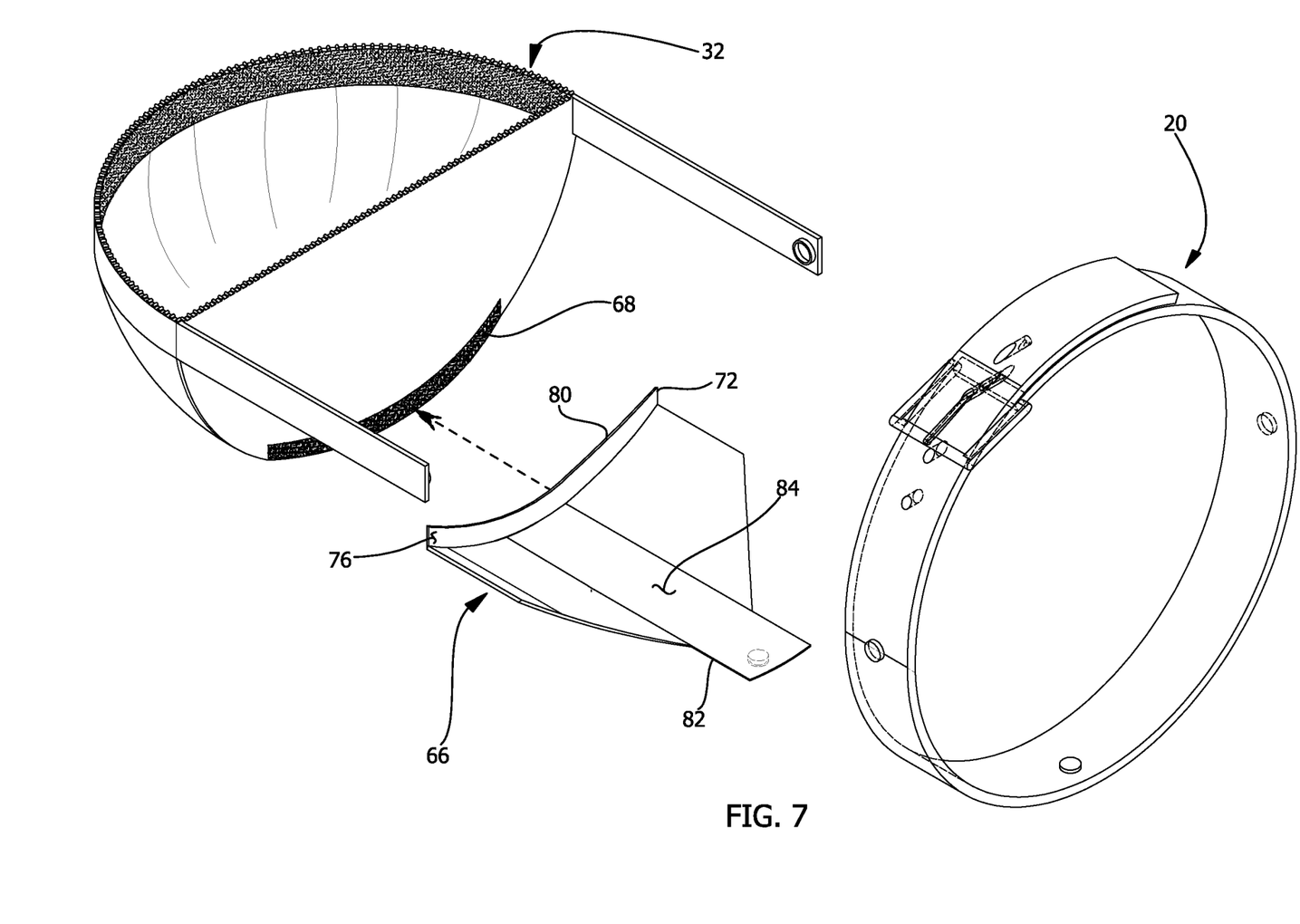
FIG. 7 is a top front isometric view of an embodiment of the disclosure.
Figure 8:
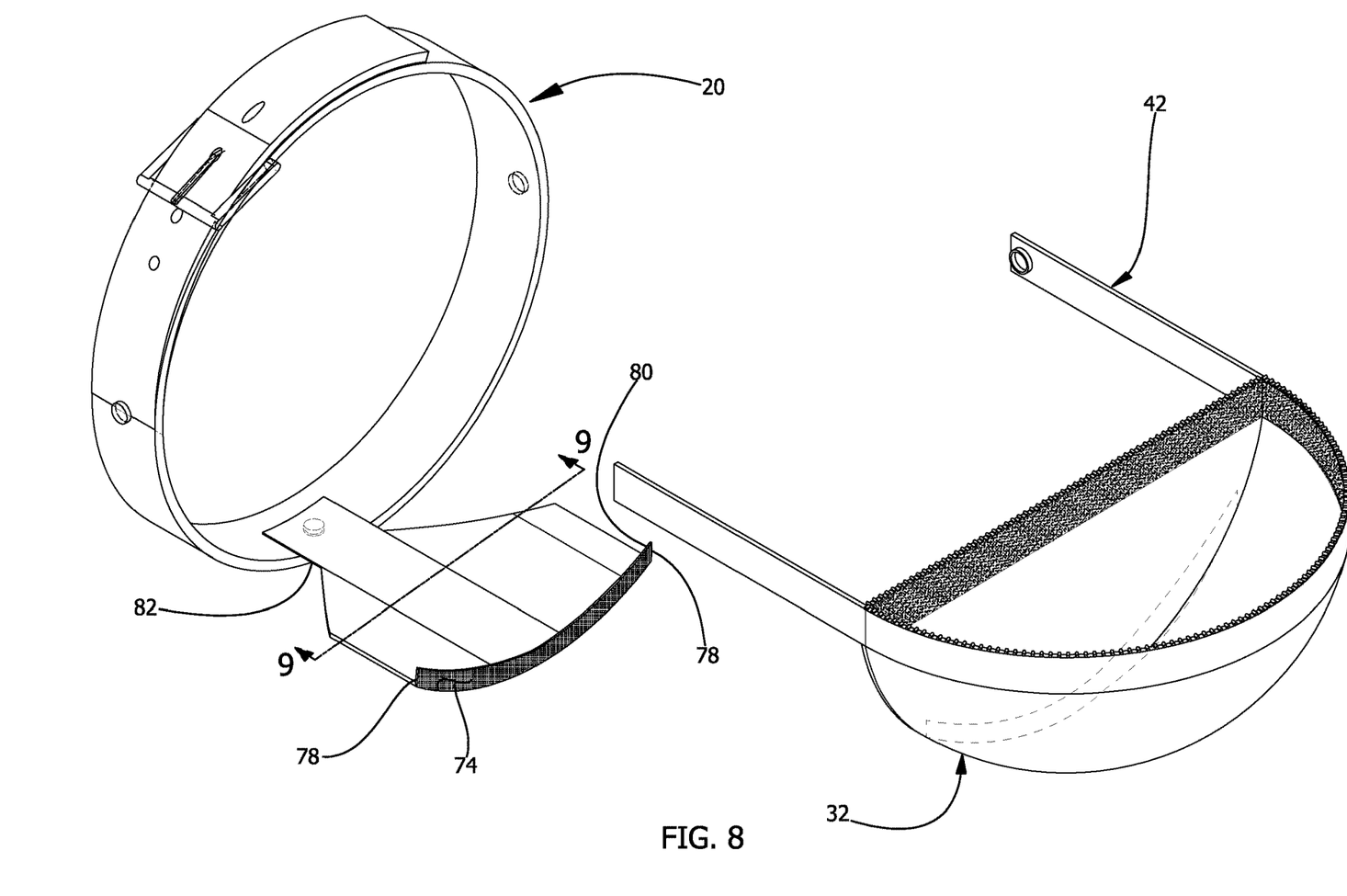
FIG. 8 is a top front isometric view of an embodiment of the disclosure.
Figure 9:
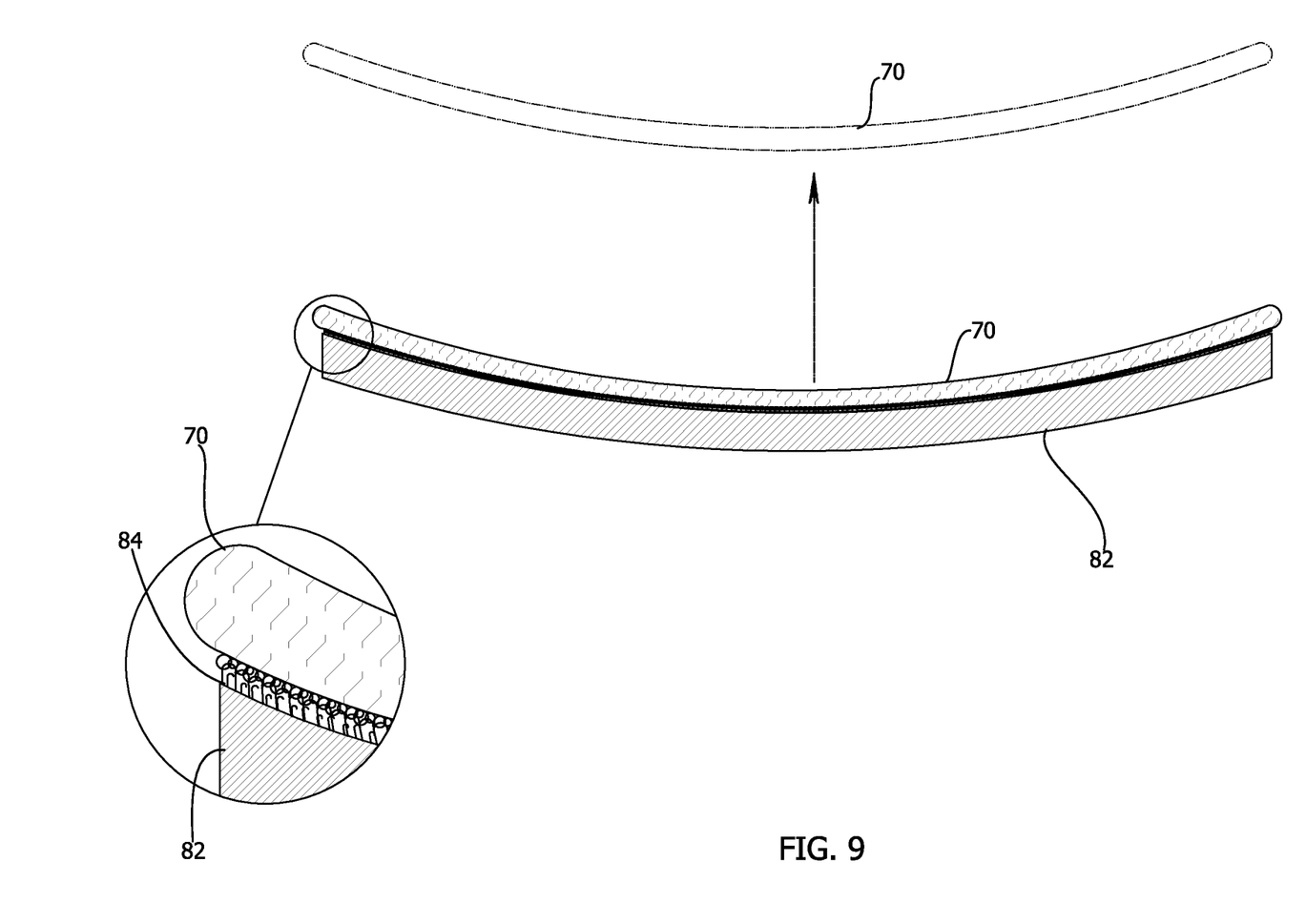
FIG. 9 is a cross-sectional view of an embodiment of the disclosure.
Figure 10:
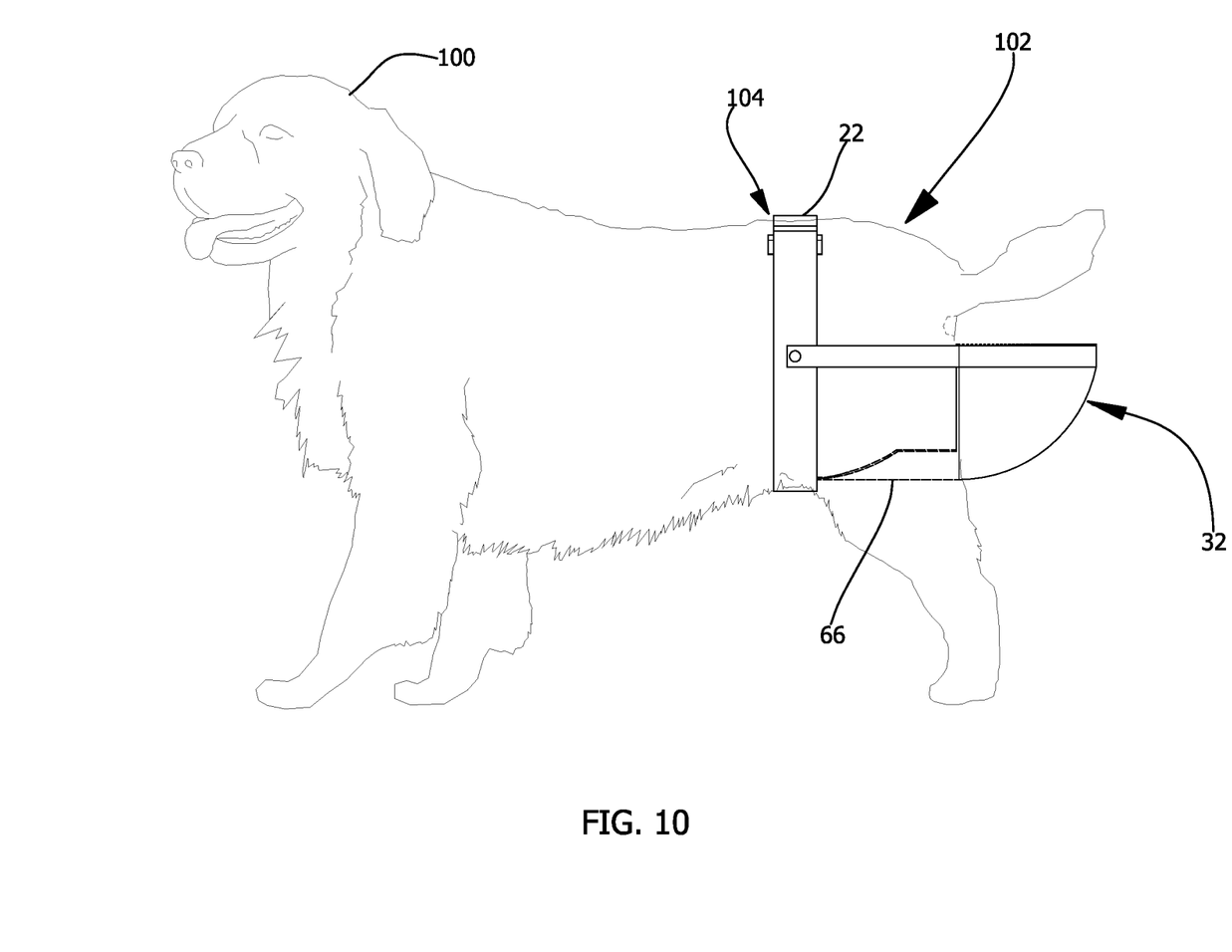
FIG. 10 is an in-use view of an embodiment of the disclosure.

With reference now to the drawings, and in particular to FIGS. 1 through 10 thereof, a new pet waste management embodying the principles and concepts of an embodiment of the disclosure and generally designated by the reference numeral 10 will be described.

As best illustrated in FIGS. 1 through 10, the animal waste collection device 10 generally comprises a harness 20 is removably positionable on a canine 100 adjacent to a hindquarter 102 of the canine 100.

The harness comprises a body strap 22 that is configured to fit around a waist 104 of the canine 100. The body strap 22 has a break 24 therein to define a first end 26 and a second end 28. Embodiments of the body strap 22 comprise a flexible material and may have a length between 8.0 inches and 44.0 inches. The length of the body strap 22 may be adjustable to better accommodate differently sized canines 100. A strap fastener 30 may be attached to the body strap 22 that is configured to releasably retain the body strap 22 in a closed loop. The user can wrap the body strap 22 around the waist 104 of the canine 100 and engage the strap fastener 30 to retain the body strap 22 in a closed loop around the waist 104.

A container 32 is configured to receive animal waste 106 from the canine 100. The container 32 has a top side 34 that is open. The container 32 has a front wall 36 and a rear wall 38 that are attached together along corresponding bottom and lateral edges thereof. The front wall 36 may be planar and the rear wall 38 may have an outer surface 40 that is convexly arcuate. For example, the front wall 36 and rear wall 40 may form a semi-circular shape. In embodiments, the container 32 may be comprised of a material retaining its shape. For example, the container 32 may be formed of a resiliently deformable material such as rubber or a rigid material such as plastic.

An attachment 42 secures the container 32 to the harness 20 such that the container 32 is positioned rearward of the canine 100. More specifically, the attachment 42 secures the container 32 to the harness 20 such that the container 32 is positioned at the hindquarter 102 of the canine 100. The open top side 34 should be directly beneath the anus of the canine 100 so that the animal waste can fall directly into the container through the open top side 32.

One embodiment of the attachment 42 comprises a first arm 44 and a second arm 46 that are each attached to and extend outwardly from the container 32. The front wall 36 is generally positioned between the first 44 and second 46 arms. A pair of couplers 48 is attached to the harness 20 and is releasably engageable with the first 44 and second 46 arms. The first 44 and second 46 arms may be comprised of a rigid material to hold the container 32 stably in position behind the canine 100.

Some embodiments may include a cover 50 that is removably coupled to the container 32 to cover the open top side 34. A retention member 52, such as a zipper, a magnet, or a hook and loop coupler, may removably couple the cover 50 to the open top side 34. The cover 50 may be included so that the user can close the open top side 34 after the canine 100 has released animal waste 106 into the container 32, thereby containing the smell of the animal waste 106 until it is convenient for the user to throw the animal waste 106 away. Instead of carrying the animal waste 106 themselves, the user can leave the animal waste 106 within the container 32, effectively allowing the canine 100 to carry the animal waste 106 until it is convenient for the user to throw it away. The animal waste collection device 10 thereby allows the user to continue enjoying their outing with the canine 100 without needing to either carry the odorous animal waste 106 themselves or immediately finding a suitable garbage can.

A waste bag 54 can be removably inserted into the container 32, thereby covering an interior surface 56 of the container 32. The waste bag 54 may generally be disposable, such as a single-use plastic bag that is designed to be discarded after the animal waste 106 is collected within the waste bag 54. The waste bag 54 protects the interior surface 56 from being damaged by the animal waste 106, or from being covered in the animal waste 106. The waste bag 54 helps ensure that the animal waste collection device 10 remains relatively clean for repeated use. In some embodiments, a drawstring 58 may be mounted on the waste bag 54 for selectively closing the waste bag 54.

A connector 60 may be included to releasably attach the waste bag 54 within the container 32 and to retain the waste bag 54 in an open condition, thereby protecting the interior surface 56 of the container 32. In embodiments, the connector 60 may comprise a hook and loop coupler including a first coupler portion 62 that is attached to the container 32 adjacent to the open top side 34 and a second coupler portion 64 that is attached to an exterior surface of the waste bag 54.

For a female dog, the above-described animal waste collection device 10 will generally be able to collect and retain both solid and fluid animal waste 106. Because a female dog urinates from a urethral orifice that is on the hindquarter 102, the container 32 is positioned to catch the urine as well as the feces. This embodiment is depicted in FIGS. 1-6. A male dog, however, urinates from a urethral orifice that is spaced apart from the hindquarter 102. Thus, a padding frame 66 may be included with some embodiments of the animal waste collection device 10 to collect urine or other fluid animal waste from a male canine 100. FIGS. 7-10 depict such an embodiment.

As shown, the padding frame 66 extends between and is attached to the harness 20 and the container 32 adjacent to a bottom edge 68 of the container 32. The padding frame 66 is configured to collect the fluid animal waste. When the animal waste collection device 10 is attached to the canine 100, the padding frame 66 will extend forward from the container 32, resting against the canine 100 behind his rear legs. The padding frame 66 will be directly below the penis of the canine 100 to collect fluid animal waste as the canine 100 urinates. With the padding frame 66, the user does not need to worry about the canine 100 making a mess by urinating. For example, the user could bring the canine 100 indoors, or take walks with the canine 100 without leaving behind fluid animal waste 106.

An absorbent material 70 is couplable to the padding frame 66. The absorbent material 70 extends outwardly from the padding frame 66 and is configured to absorb the fluid animal waste 106. The absorbent material 70 is generally configured for a single use, for example comprising a disposable padding material similar to a diaper padding.

In one embodiment, the padding frame 66 comprises a panel 72 having a rear edge 74, a front edge 76, and a pair of side edges 78. The rear edge 74 is removably coupled to the front wall 36 of the container 32. For example, the rear edge 74 may be attached to a lip having a coupler such as a hook and loop coupler, a magnetic assembly, snaps, or any other suitable coupler. The panel 72 has an upper surface 80 that is concavely arcuate between the side edges 78, mirroring the curvature of the bottom edge of the front wall 36. A tab 82 may be attached to and extend forwardly from the front edge 76. The tab 82 can be removably attached to the harness 20, securing the padding frame 66 in position beneath the canine 100. The tab 82 may have a top side 84 that is removably couplable to the absorbent material 70. For example, the absorbent material 70 may rest over the top side 84 and be releasably coupled to the top side 84 by a hook and loop coupler, an adhesive pad, or any other suitable means.

In use, the user can secure the harness 20 around the waist of the canine 100. The user can then attach the container 32 to the harness 20 using the pair of couplers 48 positioned on the first arm 44 and the second arm 46. If the canine 100 is a male, the user may choose to also secure the padding frame 66 to the harness 20 beneath the canine 100. The user can position the waste bag 54 within the container 32, securing the waste bag 54 in an open position using the connector 60. The user can then take their canine 100 for a walk, on a trip, or elsewhere without worrying about how the animal waste 106 will be collected. When the canine 100 uses the bathroom, the animal waste collection device 10 will collect the animal waste 106 for the user. After returning home or finding a suitable garbage can, the user can remove the filled waste bag 54 from the container 32 and throw it away. The user can also remove the absorbent material 70 from the padding frame 66 for disposal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An animal waste collecting apparatus comprising:
   a harness configured to be removably positionable on a canine adjacent to a hindquarter of the canine;
   a container being configured to receive animal waste from the canine, the container having a top side being open, the container having a front wall and a rear wall attached together along corresponding bottom and lateral edges thereof;
   an attachment securing the container to the harness such that the container is configured to be positioned rearward of the canine;
   a waste bag being removably inserted into and covering an interior surface of the container;
   a connector releasably attaching the waste bag within the container and retaining the waste bag in an open condition protecting the interior surface of the container, the connector further comprising a hook and loop coupler including a first coupler portion attached to the container adjacent to the open top side and a second coupler portion attached to an exterior surface of the waste bag.

2. The animal waste collecting apparatus of claim 1, the harness further comprising:
   a body strap being configured to fit around a waist of the canine, the body strap having a break therein to define a first end and a second end; and
   a strap fastener being attached to the body strap and being configured to releasably retain the body strap in a closed loop.

3. The animal waste collecting apparatus of claim 1, wherein the body strap has a length between 8.0 inches and 44.0 inches.

4. The animal waste collecting apparatus of claim 1, wherein the body strap comprises a flexible material.

5. The animal waste collecting apparatus of claim 1, wherein the container is comprised of a material retaining its shape.

6. The animal waste collecting apparatus of claim 1, the attachment further comprising:
   a first arm and a second arm being attached to and extending outwardly from the container, the front wall being positioned between the first and second arms; and
   a pair of couplers being attached to the harness and being releasably engageable with the first and second arms.

7. The animal waste collecting apparatus of claim 6, wherein the first and second arms are comprised of a rigid material.

8. The animal waste collecting apparatus of claim 1, further comprising:
   a cover being removably coupled to the container to cover the open top side; and
   a retention member removably coupling the cover to the open top side.

9. The animal waste collecting apparatus of claim 1, further comprising a drawstring being mounted on the waste bag for selectively closing the waste bag.

10. The animal waste collecting apparatus of claim 1, further comprising:
    a padding frame extending between and being attached to the harness and the container adjacent to a bottom edge of the container, the padding frame being configured to collect the fluid animal waste; and
    an absorbent material being coupled to the padding frame, the absorbent material extending outwardly from the padding frame, the absorbent material being configured to absorb the fluid animal waste.

11. The animal waste collecting apparatus of claim 1, wherein the front wall is planar and the rear wall has an outer surface that is convexly arcuate.

12. An animal waste collecting apparatus comprising:
    a harness configured to be removably positionable on a canine adjacent to a hindquarter of the canine;
    a container being configured to receive animal waste from the canine, the container having a top side being open, the container having a front wall and a rear wall attached together along corresponding bottom and lateral edges thereof;
    an attachment securing the container to the harness such that the container is configured to be positioned rearward of the canine;
    a waste bag being removably inserted into and covering an interior surface of the container;
    a padding frame extending between and being attached to the harness and the container adjacent to a bottom edge of the container, the padding frame being configured to collect the fluid animal waste; and
    an absorbent material being coupled to the padding frame, the absorbent material extending outwardly from the padding frame, the absorbent material being configured to absorb the fluid animal waste; and
    the padding frame further comprising:
       a panel having a rear edge, a front edge, and a pair of side edges, the rear edge being removably coupled to the front wall, the panel having an upper surface being concavely arcuate between the side edges; and a tab being attached to and extending forwardly from the front edge, the tab being removably attached to the harness, the tab having a top side, wherein the absorbent material is removably couplable to the top side.

13. An animal waste collecting apparatus comprising:

a harness being removably positionable on a canine adjacent to a hindquarter of the canine, the harness comprising:

a body strap being configured to fit around a waist of the canine, the body strap having a break therein to define a first end and a second end, the body strap comprising a flexible material, the body strap having a length between 8.0 inches and 44.0 inches;

a strap fastener being attached to the body strap and being configured to releasably retain the body strap in a closed loop;

a container being configured to receive animal waste from the canine, the container having a top side being open, the container having a front wall and a rear wall attached together along corresponding bottom and lateral edges thereof, the front wall being planar, the rear wall having an outer surface being convexly arcuate, the container being comprised of a material retaining its shape;

an attachment securing the container to the harness such that the container is positioned rearward of the canine, the attachment comprising:

a first arm and a second arm being attached to and extending outwardly from the container, the front wall being positioned between the first and second arms;

a pair of couplers being attached to the harness and being releasably engageable with the first and second arms;

the first and second arms being comprised of a rigid material;

a cover being removably coupled to the container to cover the open top side;

a retention member removably coupling the cover to the open top side;

a waste bag being removably inserted into and covering an interior surface of the container;

a drawstring being mounted on the waste bag for selectively closing the waste bag;

a connector releasably attaching the waste bag within the container and retaining the waste bag in an open condition protecting the interior surface of the container, the connector comprising a hook and loop coupler including a first coupler portion attached to the container adjacent to the open top side and a second coupler portion attached to an exterior surface of the waste bag;

a padding frame extending between and being attached to the harness and the container adjacent to a bottom edge of the container, the padding frame being configured to collect the fluid animal waste;

an absorbent material being coupled to the padding frame, the absorbent material extending outwardly from the padding frame, the absorbent material being configured to absorb the fluid animal waste;

the padding frame comprising:

a panel having a rear edge, a front edge, and a pair of side edges, the rear edge being removably coupled to the front wall, the panel having an upper surface being concavely arcuate between the side edges; and     a tab being attached to and extending forwardly from the front edge, the tab being removably attached to the harness, the tab having a top side, wherein the absorbent material is removably couplable to the top side.

\* \* \* \* \*